United States Patent
Ackroyd et al.

[15] 3,660,227
[45] May 2, 1972

[54] NUCLEAR REACTORS

[72] Inventors: Ronald Tunstal Ackroyd, Upton-by-Chester; Maurice Arthur Perks, Stockton Heath, nr. Warrington, both of England

[73] Assignee: United Kingdom Atomic Energy Authority, London, England

[22] Filed: Nov. 4, 1969

[21] Appl. No.: 873,922

[30] Foreign Application Priority Data

Nov. 15, 1968 Great Britain..................54,439/68

[52] U.S. Cl..................................176/17, 176/40
[51] Int. Cl.................................................G21c 1/02
[58] Field of Search.........................176/17, 18, 40

[56] References Cited

UNITED STATES PATENTS 3,335,060  8/1967  Diener..........................176/17 X
3,362,882  1/1968  Sofer et al.......................176/18

FOREIGN PATENTS OR APPLICATIONS 1,527,245  5/1968  France..........................176/17

Primary Examiner—Carl D. Quarforth
Assistant Examiner—Harvey E. Behrend
Attorney—Larson and Taylor

[57] ABSTRACT

A core configuration for a liquid metal cooled fast breeder nuclear reactor includes a generally cylindrical breeder region, a first fissile region which completely embraces the central breeder region, a second fissile region wholly or partially surrounding said first fissile region with axial and radial clearance, an inner breeder region occupying said clearance, and an outer breeder region extending from the outer boundary of the second fissile region to the boundary of the core itself, which is generally cylindrical.

A variation envisages the second fissile region only partially surrounding the first fissile region, the "corner" portions being occupied by breeder material in place of the fissile material of a completely embracing second fissile region.

5 Claims, 3 Drawing Figures

NUCLEAR REACTORS

BACKGROUND OF THE INVENTION

This invention relates to nuclear reactors, and in particular to a core configuration for liquid metal cooled fast breeder nuclear reactors.

SUMMARY OF THE INVENTION

According to the invention, a liquid metal cooled fast breeder nuclear reactor whose core is of upright generally cylindrical boundary has a core configuration which includes a central generally cylindrical breeder region, a first fissile region which completely embraces the central breeder region, a second fissile region wholly or partially surrounding said first fissile region with axial and radial clearance therebetween, an inner breeder region occupying the axial and radial clearance between the first and second fissile regions, and an outer breeder region extending both axially and radially from the outer boundary of the second fissile region to the generally cylindrical core boundary.

In a preferred construction, the said second fissile region only partially surrounds the first fissile region, the "corner" fissile portions of a wholly surrounding fissile region being replaced by breeder material. This enables the annular region between the first and second fissile regions to be entirely breeder, thereby improving the breeding ability and simplifying the design of the structural elements which in practice constitute this region. In particular, such elements, and also those constituting the outer radial breeder, can be constituted by breeder pins which are of greater diameter than the pins involving fissile material, since the heat rating (where ceramic fuel is employed) of breeder pins is lower than that for fissile pins, thereby enabling a higher breeder/structural material (such as stainless steel) ratio to be achieved. Generally, the replacement of said "corner" fissile regions by breeder can by suitable choice of parameters result, in a single enrichment core, in reduced fissile inventory and improved doubling time whilst retaining core flattening.

The radial portion of the said second fissile region, in order to achieve the omission of the "corner" fissile portions referred to in the last paragraph, thus has a maximum height of the distance between the inner boundaries of the remaining axial portions to the said second fissile region. In one specific example, the said height may be the same as the height of the hollow cylinder constituting said first fissile region.

Preferably the fissile material is mixed uranium and plutonium oxides, and the breeder material is uranium carbide, but the possibility of the employment of carbide for both fissile and breeder is not excluded.

DESCRIPTION OF THE DRAWINGS

In order that the invention may be fully understood and more readily carried into practice, embodiments thereof will now be described with reference to the accompanying diagrammatic drawings, wherein.

DESCRIPTION OF THE PREFERRED EMBODIMENTS

Figure 1:
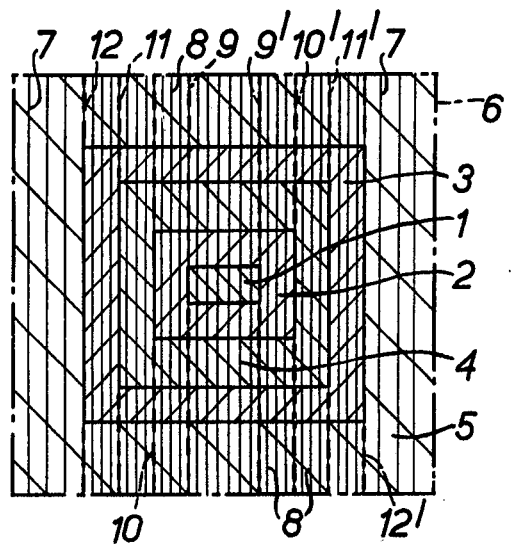
FIG. 1 is a side view in medial section of a first embodiment of core configuration.

Referring first to FIG. 1, the core configuration illustrated diagrammatically therein consists of a central generally cylindrical breeder region 1, a fissile region 2 which completely embraces the region 1, a fissile region 3 which wholly surrounds the region 2 with axial and radial clearance, a inner breeder region 4 which occupies the axial and radial clearance between regions 2 and 3, and an outer breeder region 5 which completely embraces the region 3 and extends to the generally cylindrical core boundary indicated by the dot-and-dash outline 6. In practice, the outer breeder region 5 is constituted by radial breeder pins (indicated diagrammatically by the vertical lines 7) which extend the full height of the core and are of greater diameter (e.g. 0.5 inch) than that (e.g. 0.2 inch) of pins which incorporate fissile material and constitute the remaining regions of the core, such pins of smaller diameter being indicated diagrammatically by the vertical lines 8. Thus the ratio of breeder material to structural material of the pins in the region 5 is able to be made more favorable than if pins of smaller diameter were employed. The pins of smaller diameter constituting the cylindrical regions other than region 5 can either be of full core height and incorporating the different materials therein separated by spacers, or can be separate for separate materials but axially aligned and either stacked or interconnected at their ends.

Considered as concentric core regions, the central region is cylindrical and is indicated within the dashed lines 9, 9' being constituted by small-diameter pins containing central breeder material constituting the region 1, inner axial fissile material constituting the top and bottom of the region 2, inner axial breeder material constituting part of the top and bottom of the region 4, outer axial fissile material constituting part of the top and bottom of the region 3, and outer axial breeder material constituting part of the top and bottom of the region 5.

The next concentric region considered radially outwardly is annular and is bounded by the dashed lines 10, 10' on the outside, and 9, 9' on the inside. The smaller diameter pins constituting it have central fissile material constituting the sides of the region 2, inner axial breeder material constituting the remainder of the top and bottom of the region 4, outer axial fissile material constituting a further part of the top and bottom of the region 3, and outer axial breeder material constituting a further part of the region 5.

The next concentric region considered radially outwardly is again annular and is bounded on the outside by the dashed lines 11, 11' and on the inside by 10, 10'. The smaller diameter pins constituting it have central breeder material constituting the sides of the region 4, outer axial fissile material constituting the remainder of the top and bottom of the region 3, and outer axial breeder material constituting a still further part of the top and bottom of the region 5.

Finally the radially outermost concentric region is annular and is bounded on the outside by the core side boundary 6 and on the inside by 12, 12'. The larger diameter pins constituting it incorporate, as previously described, all breeder material and form the radial breeder blanket part of the region 5.

Figure 2:
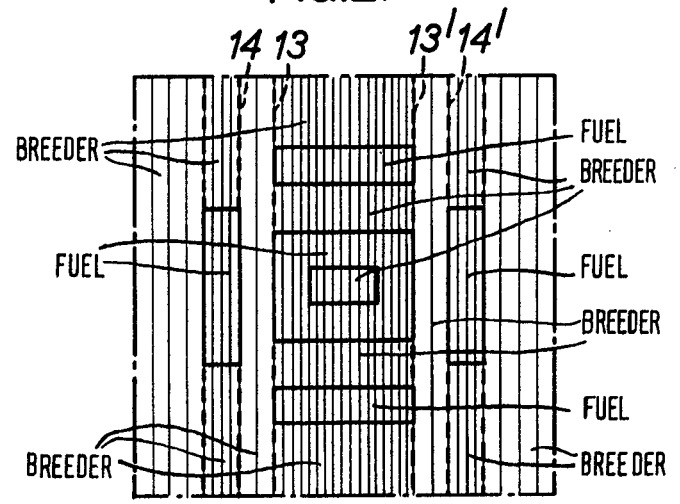
FIG. 2 is a similar view to FIG. 1 and illustrates a second embodiment.

Referring now to FIG. 2, it will be appreciated by comparing with FIG. 1 that the core configuration illustrated therein is similar to that shown in FIG. 1 except that the corners of the outer fissile region (3 in FIG. 1) have been removed. One is left with an incomplete outer fissile region which does not fully embrace the inner breeder region, and the removed parts are replaced by breeder material. This enables the provision of an inner annular breeder region extending for full core height and without fissile material, consequently, larger diameter pins can be employed with the advantage before-mentioned. Because FIG. 1 has been exhaustively described, it is thought necessary only to describe the concentric regions of the core configuration shown in FIG. 2. The central and next radially outer regions are similar to those bounded by lines 9, 9' and 10, 10', 9, 9' of FIG. 1. The next radially outer region is constituted by greater diameter pins containing only breeder material and bounded on the inside by the dashed lines 13, 13' and on the outside by dashed lines 14, 14'. The next radially outer annular region is similar to that in the core configuration of FIG. 1 which is bounded by lines 12, 12', 11, 11' except that the fissile material does not extend as far axially outwardly as it does in the core configuration of FIG. 1. The outermost annular region is similar to the same region in the core configuration of FIG. 1, being constituted by greater diameter breeder pins. The height of the outer radial fissile region is largely a matter of choice; in the configuration shown in FIG. 2 its upper and lower limits are approximately midway between the inner and outer axial fissile regions.

Figure 3:
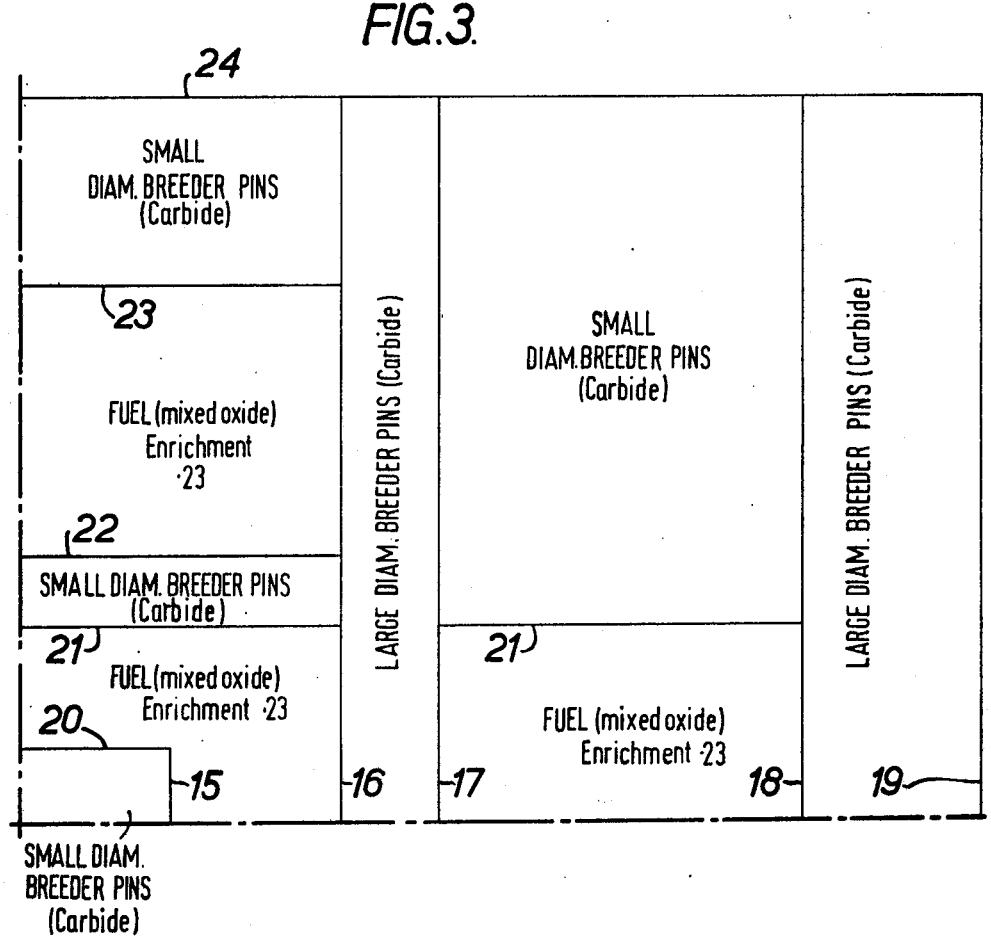
FIG. 3 is a medial section showing one quarter of a third embodiment of core configuration.

In the configuration shown in FIG. 3, the only difference from that shown in FIG. 2 is that the outer radial fissile region is of equal height to that of the inner axial fissile region. For the configuration shown in FIG. 3, the following parameters have been established Radial Dimensions

| | Radial dimension from core axis to outer boundary of zone, cm. |
|---|---|
| Central zone (to line 15) | 27 |
| 1st annular zone (to line 16) | 57 |
| 2nd annular zone (to line 17) | 75 |
| 3rd annular zone (to line 18) | 140 |
| 4th annular zone (to core boundary, line 19) | 180 |

Axial Dimensions

| | Axial dimension from core center line to boundary of region, cm. |
|---|---|
| Central breeder region (to line 20) | 12 |
| Inner axial fissile region (to line 21) | 32 |
| Outer radial fissile region (to line 21) | 32 |
| Inner axial breeder region (to line 22) | 44 |
| Outer axial fissile region (to line 23) | 92 |
| Outer axial and radial breeder regions (to core boundary, line 24) | 132 |

Other Parameters

| | |
|---|---|
| Mean enrichment | 0.257 |
| Critical mass kg. of equivalent $Pu_{239}$ | 2235 |
| Hold-up mass kg. of equivalent $Pu_{239}$ | 1982 |
| Power MW(E) | 1500 |
| Breeding gain | 0.376 |
| Inventory kg. equiv. $Pu_{239}$/MW(E) | 2.82 |
| Doubling time (years) | 13.1 |
| these figures being based on a maximum rating of 308 watts/gram, 10% burn-up, load factor of 0.75, hold-up time of 9 months, and a wastage of 2%. | |

The composition of the fissile and breeder regions is as follows:

| | Fissile Region ($PuO_2/UO_2$) v/o | Breeder region, smaller dia. pins (UC) v/o | Breeder region larger diam. pins (UC) v/o |
|---|---|---|---|
| Heavy Elements | 34.8 | 34.8 | 57 |
| Structural Materials (steel) | 23.8 | 23.8 | 22.9 |
| Sodium | 41.4 | 41.4 | 20.1 |

The advantages of core configurations according to the invention are: single enrichment, good radial and axial form factors (1.17 and 1.23 respectively for the FIG. 3 core), good overall form factor (1.44 for the FIG. 3 core), high breeding gain, short doubling time, good voiding characteristics, little gagging required, and reduced inventory.

We claim:

1. A liquid metal cooled fast breeder nuclear reactor whose core is of upright generally cylindrical boundary, having a core configuration which includes a central generally cylindrical breeder region, a first fissile region which completely embraces the central breeder region, a second fissile region at least partially surrounding said first fissile region with axial and radial clearance therebetween, an inner breeder region occupying the axial and radial clearance between the first and second fissile regions, and an outer breeder region extending both axially and radially from the outer boundary of the second fissile region to the generally cylindrical core boundary.

2. A nuclear reactor according to claim 1, wherein said second fissile region only partially surrounds the first fissile region, the "corner" fissile portions of a wholly surrounding fissile region being replaced by breeder material.

3. A nuclear reactor according to claim 2, wherein the annular region between the first and second fissile regions is entirely breeder and of full core height, and structural core elements constituting said annular region are of greater diameter than the structural core elements which include fissile material, whereby to enable a higher breeder/structural material ratio to be achieved.

4. A nuclear reactor according to claim 3, wherein the height of the radial portion of the second fissile region is the same as that of the hollow cylinder constituting the first fissile region.

5. A nuclear reactor according to claim 1, wherein the fissile material is mixed uranium and plutonium oxides, and the breeder material is uranium carbide.

* * * * *